(12) United States Patent
Aleem

(10) Patent No.: US 11,307,409 B2
(45) Date of Patent: Apr. 19, 2022

(54) METHODS AND SYSTEMS TO TRACK A GAZE OF AN EYE

(71) Applicant: North Inc., Kitchener (CA)

(72) Inventor: Idris S. Aleem, Kitchener (CA)

(73) Assignee: Google LLC, Mountain View, CA (US)

( * ) Notice: Subject to any disclaimer, the term of this patent is extended or adjusted under 35 U.S.C. 154(b) by 149 days.

(21) Appl. No.: 16/879,047

(22) Filed: May 20, 2020

(65) Prior Publication Data

US 2020/0371350 A1 Nov. 26, 2020

Related U.S. Application Data

(60) Provisional application No. 62/850,598, filed on May 21, 2019.

(51) Int. Cl.
| | |
|---|---|
| *G02B 27/00* | (2006.01) |
| *G06K 9/74* | (2006.01) |
| *G06F 3/01* | (2006.01) |
| *G02B 27/10* | (2006.01) |
| *G06K 9/00* | (2006.01) |

(52) U.S. Cl.
CPC ..... *G02B 27/0093* (2013.01); *G02B 27/1026* (2013.01); *G06F 3/013* (2013.01); *G06K 9/0061* (2013.01); *G06K 9/741* (2013.01)

(58) Field of Classification Search
CPC ............ G02B 27/0093; G02B 27/1026; G02B 2027/0178; G02B 27/0081; G02B 27/0172; G06F 3/013; G06K 9/0061; G06K 9/741; G06K 9/2027; G06K 9/00597

See application file for complete search history.

(56) References Cited

U.S. PATENT DOCUMENTS

| | | | | |
|---|---|---|---|---|
| 2010/0245093 | A1* | 9/2010 | Kobetski | G06K 9/00597 340/576 |
| 2014/0300538 | A1* | 10/2014 | Rijnders | G06F 3/013 345/156 |
| 2015/0317833 | A1* | 11/2015 | Ebstyne | G02B 27/017 345/633 |
| 2019/0324532 | A1* | 10/2019 | Aleem | G06F 3/012 |

* cited by examiner

*Primary Examiner* — Abhishek Sarma

(57) ABSTRACT

A method of tracking a gaze of an eye includes tracking the gaze of the eye in a first tracking mode. Glint data of at least one glint of the eye is obtained during at least a portion of tracking the gaze of the eye in the first tracking mode. The glint data is in a time domain and includes a time series of a spatial descriptor associated with the at least one glint. The glint data is transformed into a frequency domain to generate a glint frequency spectrum. A stability of the at least one glint is determined based on the glint frequency spectrum. If the at least one glint is determined to be unstable, tracking of the gaze of the eye is switched from the first tracking mode to a second tracking mode that is different from the first tracking mode.

20 Claims, 17 Drawing Sheets

METHODS AND SYSTEMS TO TRACK A GAZE OF AN EYE

CROSS-REFERENCE TO RELATED APPLICATIONS

This application claims the benefit of U.S. Provisional Application No. 62/850,598, filed 21 May 2019, titled "Methods and Systems to Track a Gaze of an Eye", the content of which is incorporated herein in its entirety by reference.

TECHNICAL FIELD

The disclosure relates generally to methods and systems to track a gaze of an eye and in particular to methods and systems to select a mode of tracking a gaze of an eye.

BACKGROUND

Eye tracking is a process by which one or more of a position, orientation, and motion of an eye may be measured or monitored. In many applications, this is done with a view towards determining the gaze direction of a user. There are various eye tracking techniques, the least invasive of which employs one or more optical sensors, such as cameras, to optically track the eye.

SUMMARY

A method of tracking a gaze of an eye may be summarized as including (a.1) tracking the gaze of the eye in a first tracking mode, (a.2) obtaining glint data of at least one glint of the eye during at least a portion of tracking the gaze of the eye in the first tracking mode, the glint data in a time domain, the glint data comprising a time series of a spatial descriptor associated with the glint, (a.3) transforming the glint data into a frequency domain to generate a glint frequency spectrum, (a.4) determining a stability of the glint based on the glint frequency spectrum; and (a.5) switching from tracking the gaze of the eye in the first tracking mode to tracking the gaze of the eye in a second tracking mode that is different from the first tracking mode if the at least one glint is determined to be unstable.

The glint data obtained in act (a.2) may include a spatial coordinate of a glint center of the glint as a function of time.

The transforming of act (a.3) may include Fourier transforming the glint data.

The determining of act (a.4) may include examining the glint frequency spectrum for the presence of a predetermined feature and, if the predetermined feature is present in the glint frequency spectrum, classifying the glint as unstable.

The predetermined feature may be obtained based on a plurality of sets of glint data.

The method may include conditioning the glint frequency spectrum to filter the predetermined feature to form a conditioned glint frequency spectrum and transforming the conditioned glint frequency spectrum into the time domain.

The method may include, if the predetermined feature is present in the glint frequency spectrum, comparing the predetermined feature against a library of features to determine a type of physical motion associated with the predetermined feature.

The obtaining of act (a.2) may include directing a source light onto a beam splitter to split the source light into a plurality of output beams; directing the output beams onto the eye; detecting a plurality of reflected beams reflected from the eye, each of the reflected beams associated with a corresponding output beam; and obtaining corresponding glint data associated with each of the reflected beams.

The obtaining of act (a.2) may include directing a light beam onto the eye to generate a first reflected beam and a second reflected beam reflected from the eye; detecting the first reflected beam traveling along a first path from the eye to a detector; detecting the second reflected beam traveling along a second path from the eye to the detector, a length of the second path being different than a corresponding length of the first path; and obtaining corresponding glint data associated with each of the first reflected beam and the second reflected beam.

Tracking the gaze of the eye in the first tracking mode may be based on tracking a glint center of the at least one glint. Tracking the gaze of the eye in the second tracking mode may be based on tracking a glint-pupil vector associated with the at least one glint.

A system for tracking a gaze of an eye may be summarized as including a light source to generate a source light; a spatial modulator to receive the source light from the light source; an optical element to receive the source light from the spatial modulator and direct the source light towards an eye of a viewer; a detector to detect a reflected light reflected from the eye, the reflected light associated with the source light, the reflected light comprising at least one glint of the eye; and a controller in communication with the light source, the spatial modulator, and the detector. The controller is to: track a gaze of the eye in a first tracking mode; receive glint data from the detector, the glint data in a time domain, the glint data comprising a time series of a spatial descriptor associated with the at least one glint of the eye; transform the glint data into a frequency domain to generate a glint frequency spectrum; determine a stability of the glint based on the glint frequency spectrum; and switch tracking of the gaze of the eye from the first tracking mode to a second tracking mode that is different from the first tracking mode if the at least one glint is determined to be unstable.

The glint data may comprise a spatial coordinate of a glint center of the glint as a function of time.

The controller may transform the glint data by applying Fourier transform to the glint data.

The controller may examine the glint frequency spectrum for the presence of a predetermined feature and, if the predetermined feature is present in the glint frequency spectrum, classify the glint as unstable.

The controller may obtain the predetermined feature based on a plurality of sets of glint data.

The controller may further condition the glint frequency spectrum to filter the predetermined feature to form a conditioned glint frequency spectrum and may transform the conditioned glint frequency spectrum into the time domain.

If the predetermined feature is present in the glint frequency spectrum, the controller may further compare the predetermined feature against a library of features to determine a type of physical motion of the viewer associated with the predetermined feature.

The system may further include a beam splitter disposed in an optical path between the spatial modulator and the optical element, the beam splitter to receive the source light from the spatial modulator and to split the source light into a plurality of output beams propagating towards the optical element. The optical element may be to direct the output beams towards the eye; the reflected light may comprise a plurality of reflected beams each associated with a corresponding one of the output beams, the reflected beams each comprising an associated glint of the eye; and to receive the glint data the controller may be to receive corresponding glint data associated with each of the plurality of the reflected beams.

The reflected light may include a first reflected beam associated with the source light, the first reflected beam traveling along a first path from the eye to the detector; and a second reflected beam associated with the source light, the second reflected beam traveling along a second path from the eye to the detector, a length of the second path being different than a corresponding length of the first path. To receive the glint data the controller may receive corresponding glint data associated with each of the first reflected beam and the second reflected beam.

The controller may track the gaze of the eye in the first tracking mode by tracking a glint center of the at least one glint. The controller may track the gaze of the eye in the second tracking mode by tracking a glint-pupil vector associated with the at least one glint.

The foregoing general description and the following detailed description are exemplary of the invention and are intended to provide an overview or framework for understanding the nature of the invention as it is claimed. The accompanying drawings are included to provide further understanding of the invention and are incorporated in and constitute part of this specification. The drawings illustrate various embodiments of the invention and together with the description serve to explain the principles and operation of the invention.

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1A:
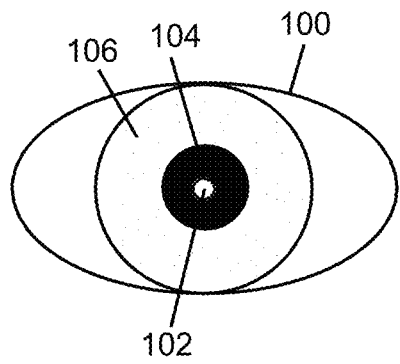
FIGS. 1A, 1B, 1C, 1D, and 1E show schematic representations of an eye and its associated glint, in accordance with a non-limiting implementation.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices have not been shown or described in detail to avoid unnecessarily obscuring descriptions of the embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise.

In this disclosure, unless the context requires otherwise, throughout the specification and claims which follow, the word "comprise" and variations thereof, such as, "comprises" and "comprising" are to be construed in an open, inclusive sense, that is as "including, but not limited to."

In this disclosure, reference to "one implementation" or "an implementation" or to "one embodiment" or "an embodiment" means that a particular feature, structures, or characteristics may be combined in any suitable manner in one or more implementations or one or more embodiments.

In this disclosure, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the disclosure provided herein are for convenience only and do not interpret the scope or meaning of the embodiments.

In this disclosure, the term "infrared" will be understood to include "near infrared" and will generally refer to a wavelength of light that is larger than the largest wavelength of light that is typically visible to the average human eye. Light that is visible to the average human eye, i.e., "visible light" herein, is generally in the range of 400 nm-700 nm. Thus, as used herein, the term "infrared" refers to a wavelength that is greater than 700 nm, up to 1 mm.

In this disclosure, the term "wearable heads-up display" refers to an electronic device that may be worn on the head of the user, that secures at least one display within a field of the view of the user when worn on the head of the user, and that enables the user to see displayed content without preventing the user from seeing the external environment of the user. The component of the wearable heads-up display on which content is displayed is either transparent or semi-transparent or at a periphery of the field of view of the user to enable viewing of the displayed content without preventing viewing of the external environment. The user, when wearing the heads-up display, may also be referred to as "the wearer". In addition, the user, when viewing the display of the wearable heads-up display, may also be referred to as the viewer.

In this disclosure, the term "home position," as used with a wearable heads-up display, refers to the optimal snug position, or a normal resting position, of a support frame of the wearable heads-up display on the head of a given user. The home position is the position of the wearable heads-up display on the head of a given user at which content may be displayed within the field of view of the user.

In this disclosure, the term "glint center position" or "glint center" refers to a representative position of a glint relative to an image of an eye. The glint center may be an approximate geometric center of the glint. Glints are typically small compared to the overall eye such that an edge of the glint, or any point within the glint, may be a useful approximation of the center of the glint.

In this disclosure, the term "pupil center position" refers to a representative position of a pupil relative to an image of an eye. The pupil center may be an approximate geometric center of the pupil.

When an eye is illuminated with infrared light (or visible light), specular reflections are generated at different ocular interfaces in the eye. These reflections are commonly referred to as Purkinje images, named after the Czech anatomist and physiologist Johann Purkinje. The first and brightest of the Purkinje images (P1 image) is from the outer surface of the cornea and is known as "glint."

Tracking the gaze of an eye may be generically or interchangeably referred to as eye tracking. Some techniques for eye tracking involve illuminating or flooding the eye with infrared light and measuring reflections from the eye with at least one optical sensor that is tuned to be sensitive to the infrared light. Reflections of infrared light from the eye are analyzed to determine the position, orientation, and/or motion of one or more eye features, such as the cornea, pupil, iris, and/or retinal blood vessels.

Eye tracking may be implemented in near-eye or head-mounted devices that have a structure to deliver light to the eye. One example of such near-eye or head-mounted devices is a wearable heads-up display that may be worn on the head like conventional glasses. In wearable heads-up displays, eye tracking may enable a variety of functionalities, such as influencing where content is displayed in the field of view of the user, conserving power by not displaying content that is outside of the field of view of the user, influencing what content is displayed to the user, determining where the user is looking or gazing, determining whether the user is looking at displayed content on the display or at scenes in the external environment, and providing an interface through which the user may control or interact with displayed content.

Eye tracking functionality if incorporated into a wearable heads-up display will need to be robust enough to accommodate movements of the wearable heads-up display or head of the user wearing the wearable heads-up display. Without such robustness, movements of the wearable heads-up display or head of the user during eye tracking may lead to errors or inconsistencies in the gaze positions obtained from eye tracking. Some eye tracking systems use multiple cameras and some method of fusing the data from the multiple cameras to improve robustness of eye tracking. Other eye tracking systems use position, proximity, acceleration, or motion sensors to sense and correct for movements of the heads-up display. However, there are challenges with incorporating multiple cameras or sensors into a wearable heads-up display due to space constraints in the wearable heads-up display or other design requirements of the wearable heads-up display.

Figure 1B:
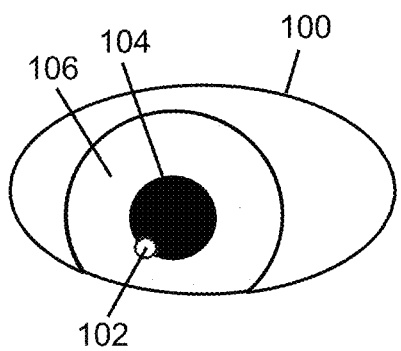
Figure 1C:
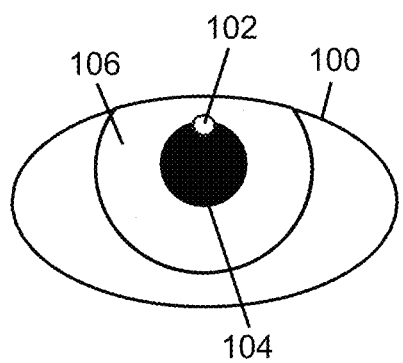

Monitoring changes in the glint of an eye that is being tracked may allow for detecting or accounting for movements of the heads-up display, while reducing or eliminating the need for additional cameras or sensors dedicated to sensing the movements of the display. FIGS. 1A-1C illustrate an eye 100 illuminated with infrared light. A glint 102 appears as a bright spot on pupil 104 or iris 106 of eye 100. FIGS. 1A-1C show glint 102 at different positions on eye 100 depending on the gaze direction of eye 100.

By detecting specular reflections of infrared light from eye 100 over a time period, changes in glint center position may be determined and used to determine changes in gaze position of eye 100 over the time period. As such, tracking a glint center of the glint may provide a tracking mode for tracking a gaze of eye 100. When the infrared light used in illuminating the eye is provided by a wearable heads-up display, the position of the glint on the eye may also change with movements of the wearable heads-up display that are not correlated with gaze movements. In this case, glint center position may not provide a reliable estimate of the gaze position.

Figure 1D:
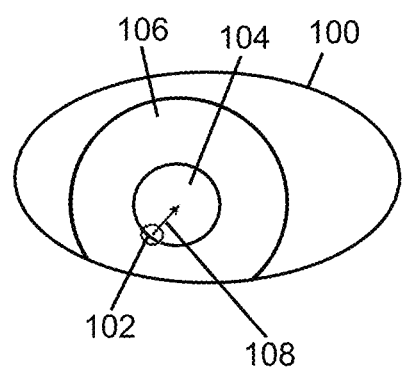
Figure 1E:
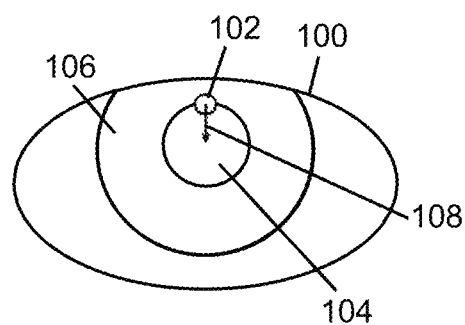

Using glint center position as a reference position, a glint-pupil vector joining the glint center and pupil center may be determined. FIGS. 1D and 1E show a glint-pupil vector 108 joining the centers of glint 102 and pupil 104 for different gaze directions of the eye. As illustrated in FIGS. 1D and 1E, glint-pupil vector 108 responds to changes in eye gaze. Tracking a glint-pupil vector may provide another tracking mode for tracking a gaze of eye 100. For some geometries, glint-pupil vector may be less sensitive to movements of the wearable heads-up display that are not accompanied by gaze movements. This may allow glint-pupil vector 108 to give a more reliable estimate of the gaze position when glint center position alone may not.

Figure 2:
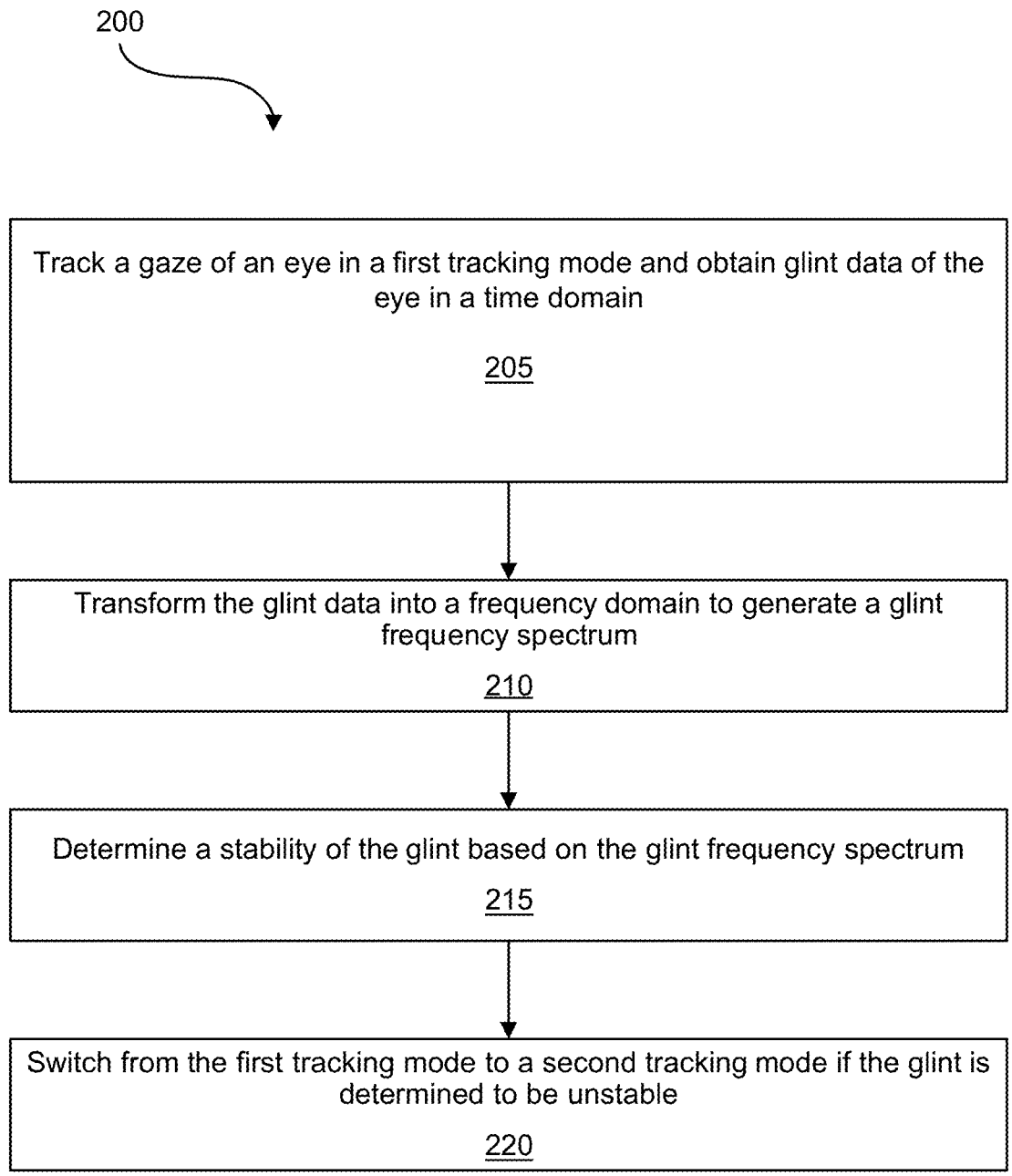
FIG. 2 shows a flowchart of an example method to track a gaze of an eye, in accordance with a non-limiting implementation.

While eye tracking modes based on the glint center and on the glint-pupil vector are described herein, it is contemplated that other glint-based and non-glint-based eye tracking modes may also be used. As described above, some of these eye tracking modes may be less sensitive to movements of the heads-up display than other eye tracking modes. FIG. 2 shows a flowchart of an example method 200, which may be used to switch between eye tracking modes based on instability of the glint that may be caused by movements of the wearable heads-up display.

At box 205, a gaze of an eye is tracked in a first tracking mode. During at least a portion of tracking the gaze of the eye in the first tracking mode, glint data of a glint of the eye is obtained. The glint data may be in a time domain. For example, the glint data may comprise a time series of a spatial descriptor associated with the glint. In some examples, such a time series may comprise a plurality of values of the spatial descriptor of the glint, where each value is recorded at a different time. Moreover, in some examples the glint data may comprise a spatial coordinate of the glint center of the glint as a function of time. It is contemplated that other types of glint data may also be used.

Furthermore, in some examples the glint data may be tracked for a given time window and stored in a buffer. In some examples the time window may be a rolling time window. Storing the glint data may allow the data to be captured and made available for manipulation or processing during the subsequent steps of method 200.

At box 210, the glint data is transformed into a frequency domain to generate a glint frequency spectrum. In some examples, a Fourier transform or one of its variants may be used to transform the glint data into the glint frequency spectrum. It is also contemplated that in some examples transformations other than a Fourier-type transform may also be used.

Moreover, at box 215, a stability of the glint may be determined based on the glint frequency spectrum. In some examples, determining the stability of the glint based on the glint frequency spectrum may comprise examining the glint frequency for the presence of a predetermined feature. Examples of such features include peaks or sets of peaks, patterns, slopes or changes of slope, inflection points, values or normalized values, and the like found in or in relation to the glint frequency spectrum. In some examples, the predetermined feature may comprise a characteristic of a portion of or all of the glint frequency spectrum. If the predetermined feature is present in the glint frequency spectrum, then the glint may be classified as unstable.

Such instability in the glint may be caused by or be a result of movements of the wearable heads-up display relative to its home position or relative to the head, face, or eye of the wearer of the display. At box 220, the eye tracking may be switched from the first tracking mode to a second tracking mode if the glint is determined to be unstable. In this manner, when the display is moving and the glint is unstable, the eye tracking may be switched to a second mode, which may be less sensitive to the movement and the glint instability.

For example, if the first tracking mode relies on tracking the glint center of the glint, the second tracking mode may use tracking of the glint-pupil vector. As discussed above, eye tracking using the glint-pupil vector may be less sensitive to movement of the heads-up display than eye tracking using the glint center. In some examples, the first tracking mode may be the default eye tracking mode, and the second tracking mode may be triggered under select conditions, such as when the wearable heads-up display is experiencing unstable movements or when the user has initiated an action that depends on accurate gaze position information. Moreover, in some examples the first eye tracking mode may be set as the default eye tracking mode because it may be faster or consume less power than the second eye tracking mode.

In some examples, the glint data and its frequency may be monitored on an on-going basis. For example, a rolling time window of time-domain glint data may be transformed to glint frequency spectra on a periodic or ongoing basis. The frequency spectra may then be examined for the presence of the predetermined features indicative of glint instability. In some examples, if a previously unstable glint becomes stable again, the eye tracking mode may be switched from the second mode back to the first mode.

Moreover, in some examples, the predetermined feature or set of features that may be indicative of glint instability may be obtained based on a plurality of sets of glint data. For example, a training data set may be obtained which comprises glint frequency spectra which are pre-labelled as representing stable or unstable glint. This training data set may then be used to train a classification engine such as a machine learning model, a neural network, and the like. Once trained, this classification engine may then be used to determine whether a given glint frequency spectrum represents stable or unstable glint, or whether the given glint frequency spectrum has the predetermined feature indicative of glint instability.

Furthermore, in some examples a library or database may be maintained of known features that may be indicative of glint instability. A comparison engine may be used to compare the glint frequency spectrum against the features stored in the database to determine whether the spectrum includes a feature that may be indicative of glint instability.

Moreover, in some examples a corresponding library or database may be maintained of known features that may be indicative of or associated with certain types of physical motion or activity. A similar comparison of the glint frequency spectrum against the corresponding library or database may be used to determine the type of physical motion associated with the predetermined feature. For example, the glint frequency spectrum may be compared against the corresponding library or database to determine whether the glint instability may be caused by walking, running, horseback riding, skiing, and the like. In this manner, the glint frequency spectrum may be used to detect and track the physical activities of the wearer of the heads-up display. Furthermore, it is contemplated that in some examples, a classification engine may be used to detect or determine the type of physical motion or activity.

In addition, in some examples once the predetermined feature or set of features indicative of instability is found in the glint frequency spectrum, the feature or set of features may be attenuated to condition or remediate the glint frequency spectrum to form a conditioned glint frequency spectrum. For example, the glint frequency spectrum or a portion thereof may be filtered to attenuate or remove the predetermined feature. In some examples, the conditioned glint frequency spectrum may then be transformed back into the time domain.

In converting the glint data from the time domain into the frequency domain, the range of the glint frequency spectrum may be enhanced by increasing the number of data values or the sampling frequency of the glint data associated with the glint. In addition, as eye movement may be quite rapid, having a larger number glint data values in a given eye tracking period may allow for more accurate tracking of the eye gaze and the eye saccades. In some examples, obtaining the glint data may comprise directing a source light onto a beam splitter to split the source light into a plurality of output beams. Then, the output beams may be directed onto the eye whose gaze is to be tracked. A plurality of reflected beams reflected from the eye may then be detected. Each of the reflected beams may be associated with a corresponding output beam. Moreover, glint data associated with each of the reflected beams may be obtained. In this manner, the number of glint data values may be increased. For example, if the beam splitter splits the source light into n output beams, each of which produces a reflected beam bearing glint data, the number of glint data values may be increased up to n-fold.

Furthermore, in some examples the number of glint data points may be increased by using a light beam directed onto the eye to generate and collect multiple reflected beams each bearing glint data. For example, obtaining glint data may comprise directing a light beam onto the eye to generate a first reflected beam and a second reflected beam reflected from the eye. The first reflected beam may travel along a first path from the eye to a detector. Similarly, the second reflected beam may travel along a second path from the eye to the detector. The length of the second path may be different than the length of the first path. Then, corresponding glint data associated with each of the first reflected beam and the second reflected beam may be obtained. The glint obtained from the first and second reflected beams may be referred to as primary and secondary glints. The difference in the path lengths may allow the two reflected beams to include temporally distinct information regarding the glint. In this manner, collecting multiple reflected beams each including temporally separated glint data may also allow for increasing the number of glint data values.

Figure 3:
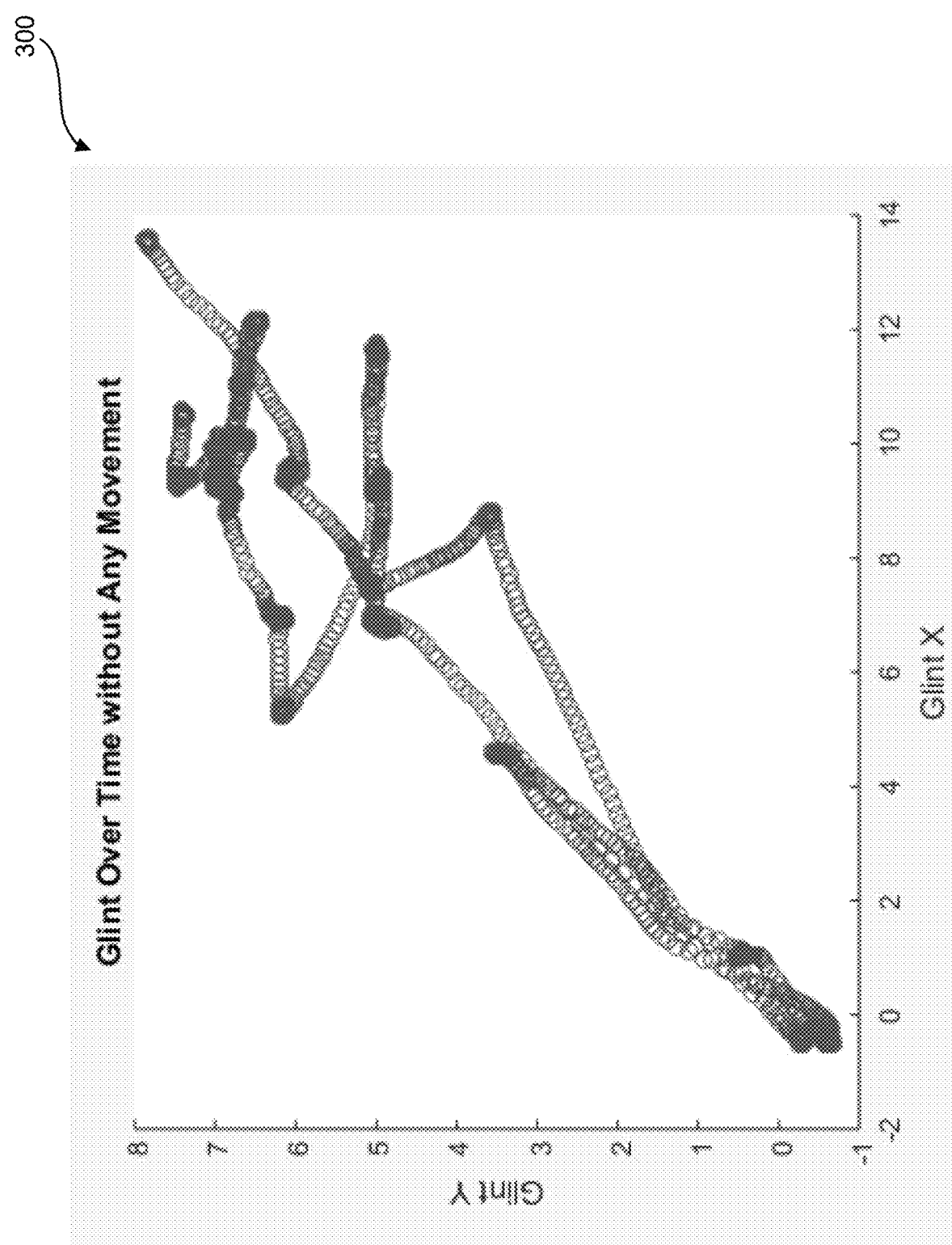
FIG. 3 shows an example graph of an example plot of example X and Y spatial coordinates of a glint center over time of an eye being tracked, in accordance with a non-limiting implementation.
Figure 4:
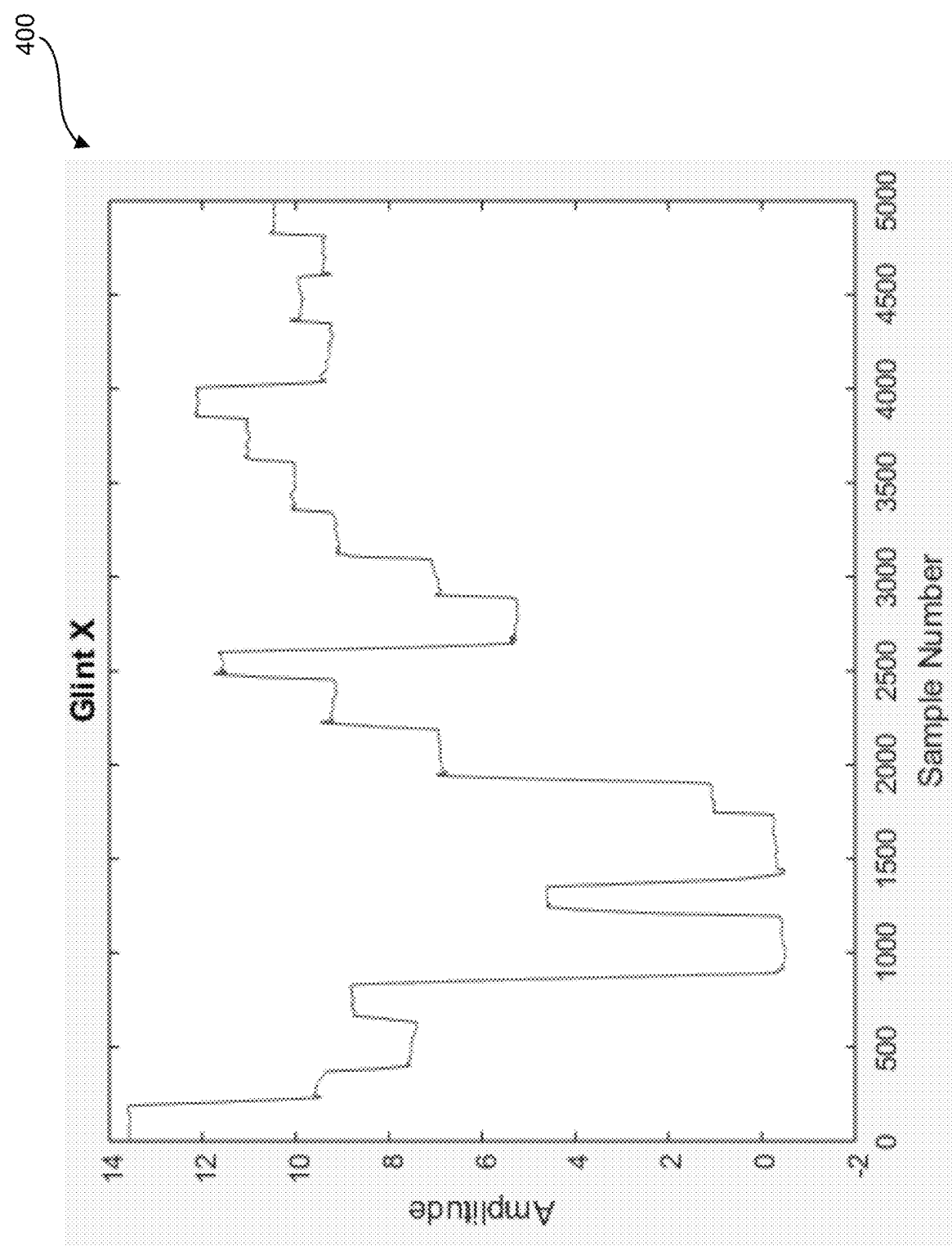
FIG. 4 shows an example graph, which plots the X coordinates of the glint data of the graph of FIG. 3 as a time series, in accordance with a non-limiting implementation.
Figure 5:
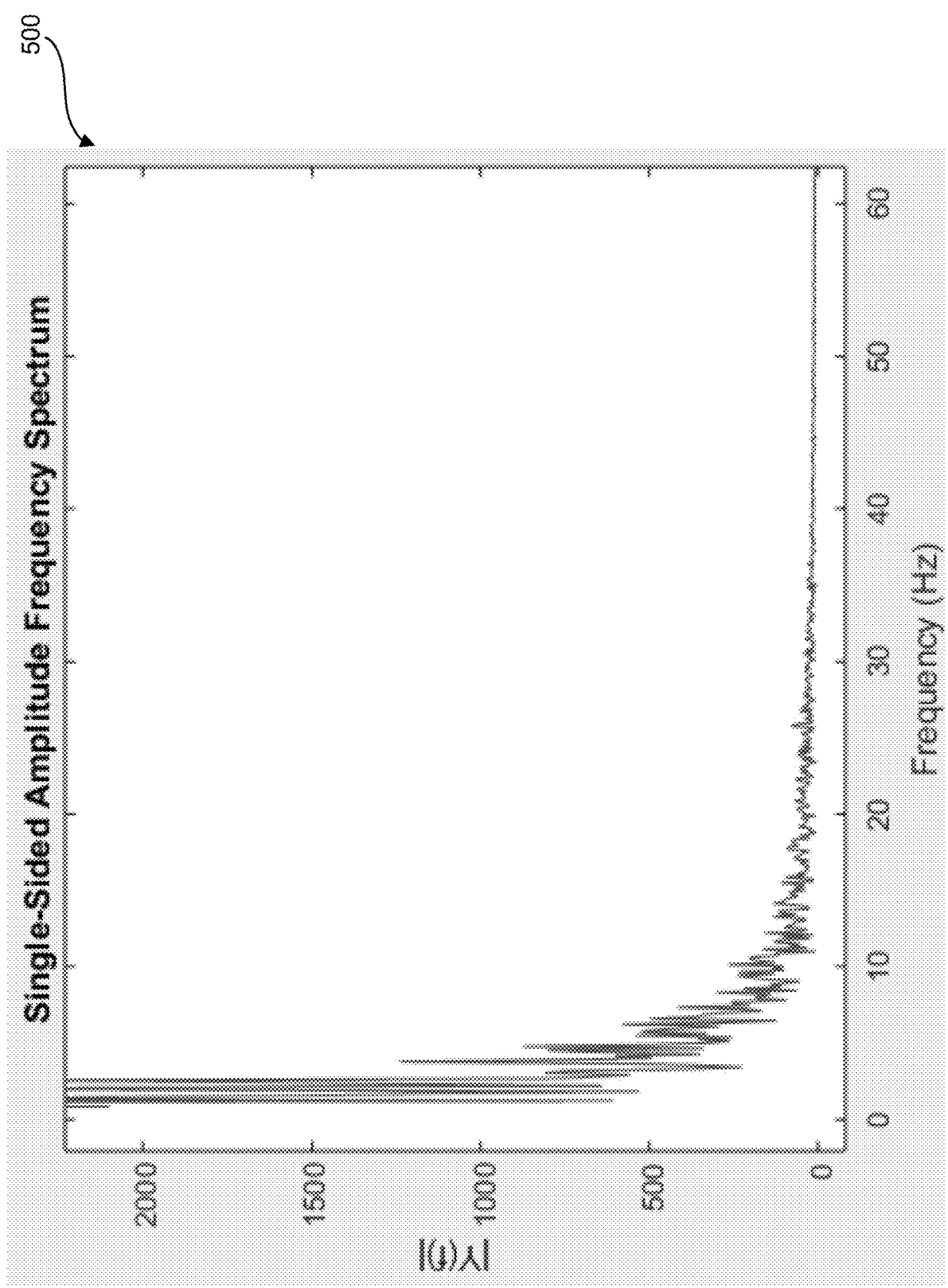
FIG. 5 shows an example graph of an example glint frequency spectrum of the glint data shown in FIG. 4, in accordance with a non-limiting implementation.

Turning now to FIG. 3, an example graph 300 is shown. Graph 300 shows an example plot of example X and Y spatial coordinates of a glint center over time of an eye being tracked. In graph 300, there is no movement of the wearable heads-up display and no resulting glint instability. FIG. 4, in turn, shows an example graph 400, which plots the X coordinates of the glint data of graph 300 as a time series. Moreover, FIG. 5 shows an example graph 500, which shows the glint frequency spectrum of the glint data shown in FIG. 4.

Figure 6:
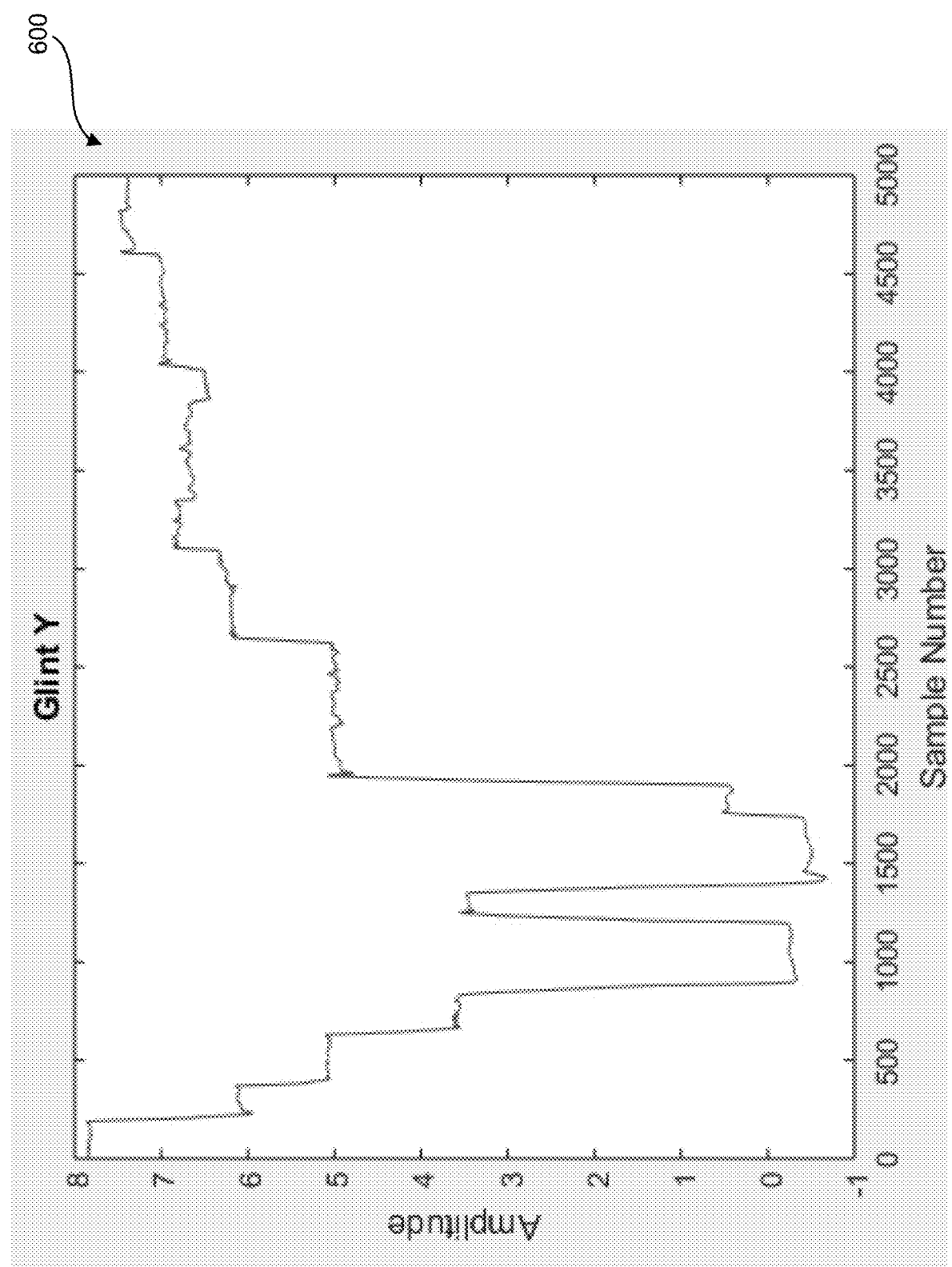
FIG. 6 shows an example graph, which plots the Y coordinates of the glint data of the graph of FIG. 3 as a time series, in accordance with a non-limiting implementation.
Figure 7:
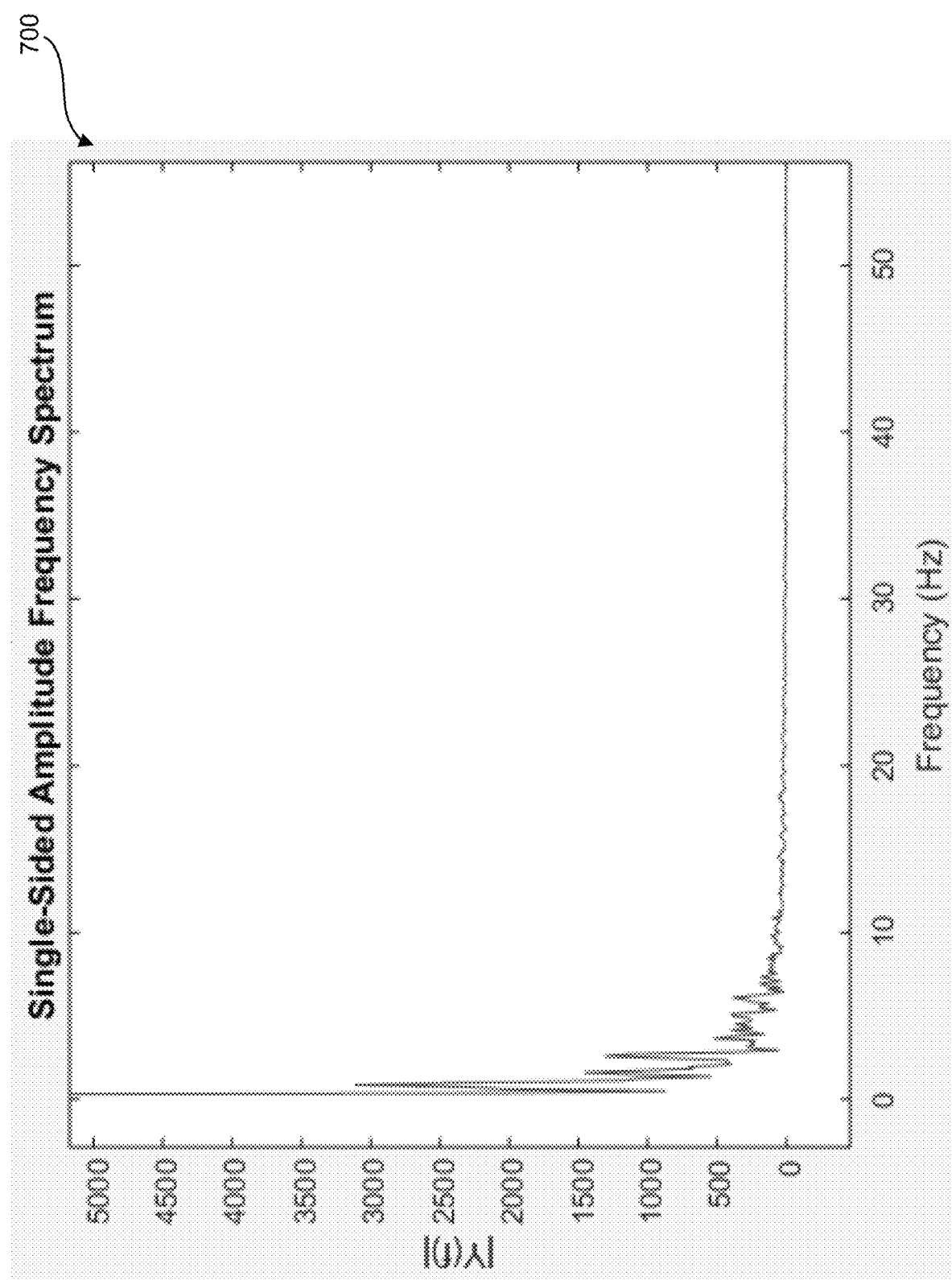
FIG. 7 shows an example graph of an example glint frequency spectrum of the glint data shown in FIG. 6, in accordance with a non-limiting implementation.
Figure 8:
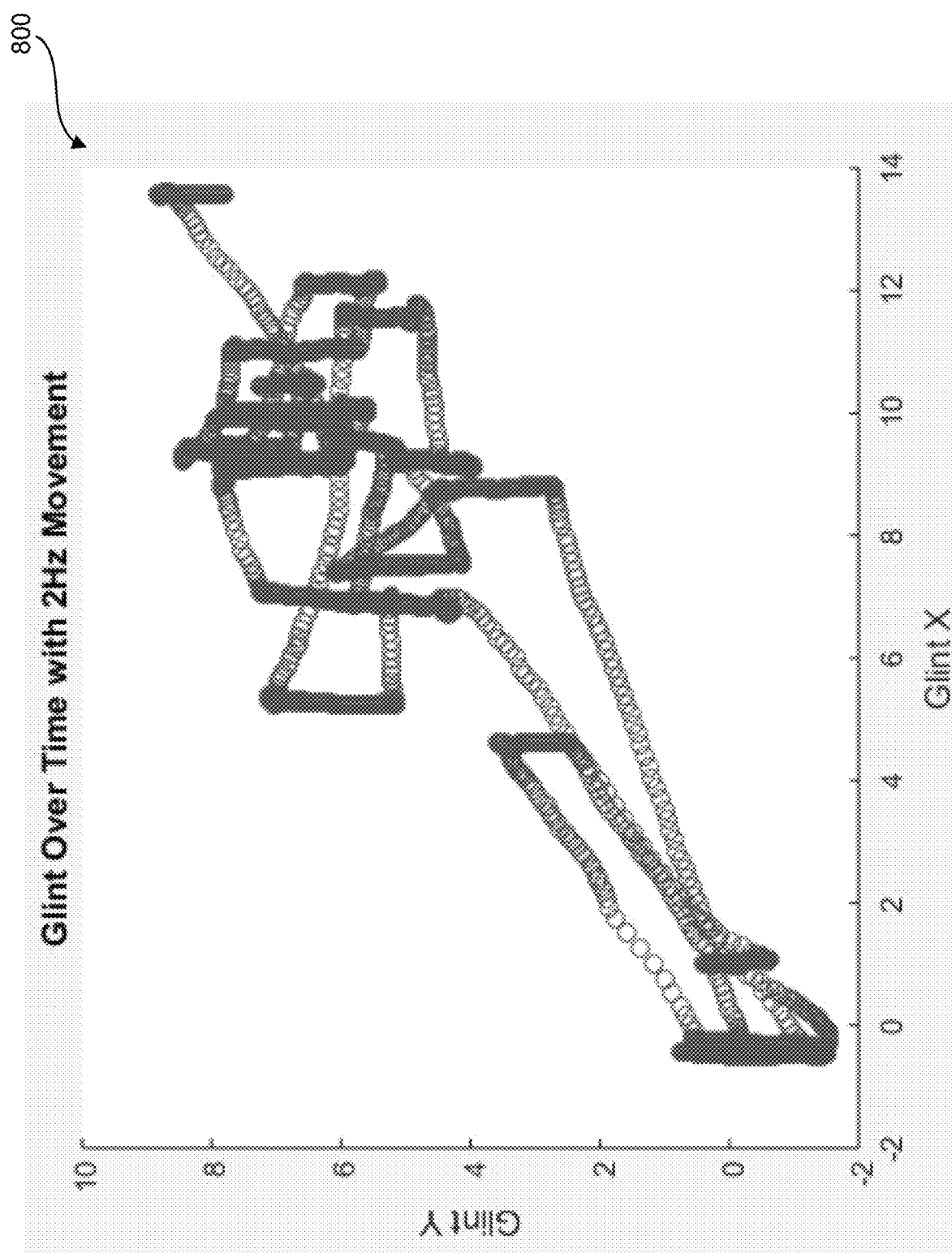
FIG. 8 shows an example graph of an example plot of example X and Y spatial coordinates of a glint center over time of an eye being tracked, in accordance with a non-limiting implementation.

In addition, FIG. 6 shows an example graph 600, which plots the Y coordinates of the glint data of graph 300 as a time series. Moreover, FIG. 7 shows an example graph 700, which shows the glint frequency spectrum of the glint data shown in FIG. 6. FIG. 8, in turn, shows an example graph 800, which shows an example plot of example X and Y spatial coordinates of a glint center over time of an eye being tracked. Graph 800 comprises the glint data of graph 300, with some movement of the wearable heads-up display added to simulate the wearer of the heads-up display walking.

Figure 9:
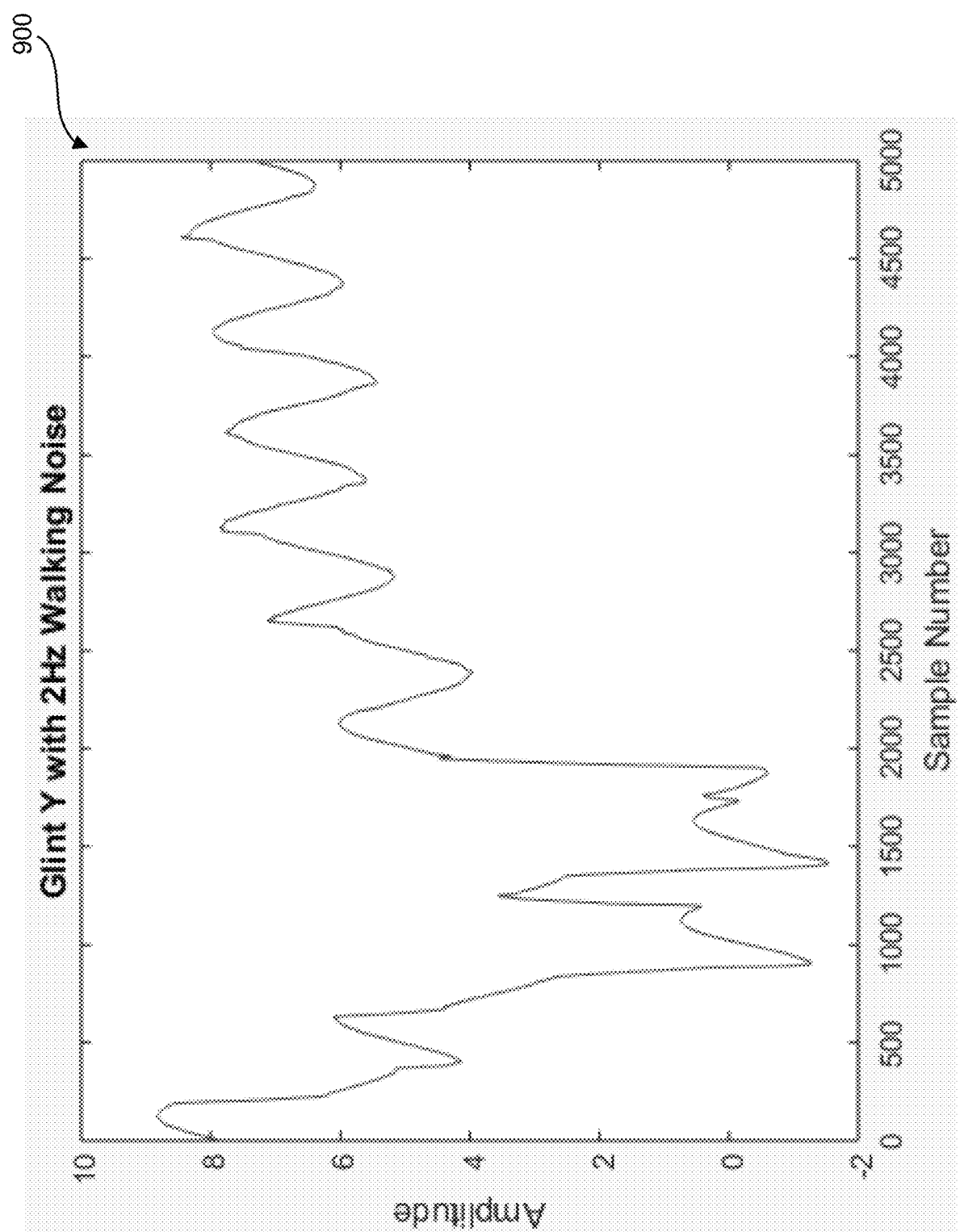
FIG. 9 shows an example graph, which plots the Y coordinates of the glint data of the graph of FIG. 8 as a time series, in accordance with a non-limiting implementation.
Figure 10:
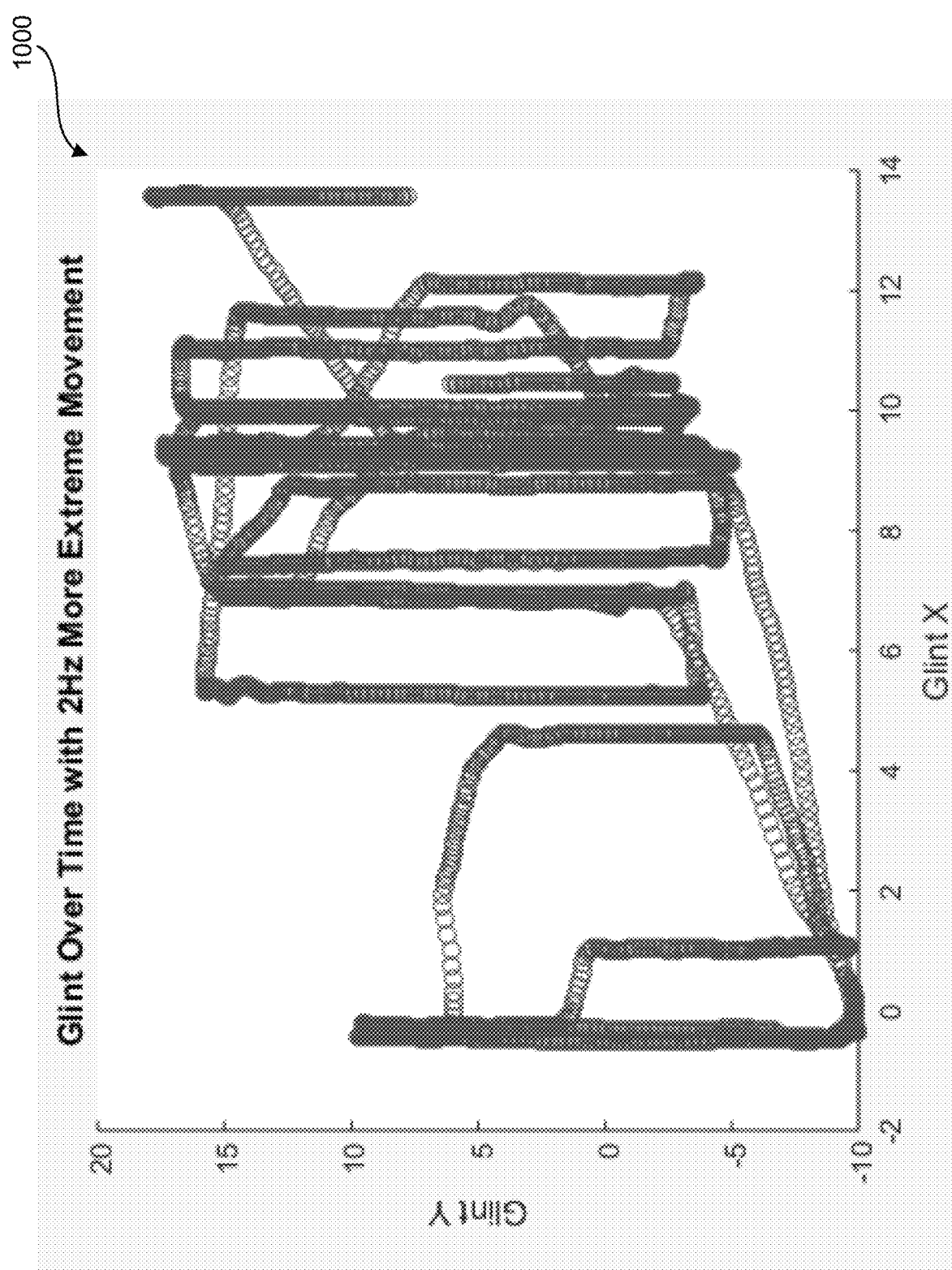
FIG. 10 shows an example graph of an example plot of example X and Y spatial coordinates of a glint center over time of an eye being tracked, in accordance with a non-limiting implementation.

Moreover, FIG. 9 shows an example graph 900, which plots the Y coordinates of the glint data of graph 800 as a time series. When comparing graph 600 to graph 900, the changes due to the simulated movements/walking may be observed. Turning now to FIG. 10, an example graph 1000 is shown. Graph 1000 shows an example plot of example X and Y spatial coordinates of a glint center over time of an eye being tracked. Graph 1000 comprises the glint data of graph 300, with relatively more extensive movement of the wearable heads-up display added to simulate the wearer of the heads-up display walking briskly or riding a horse. The movements added in graph 1000 have higher amplitude than the movements added in graph 800.

Figure 11:
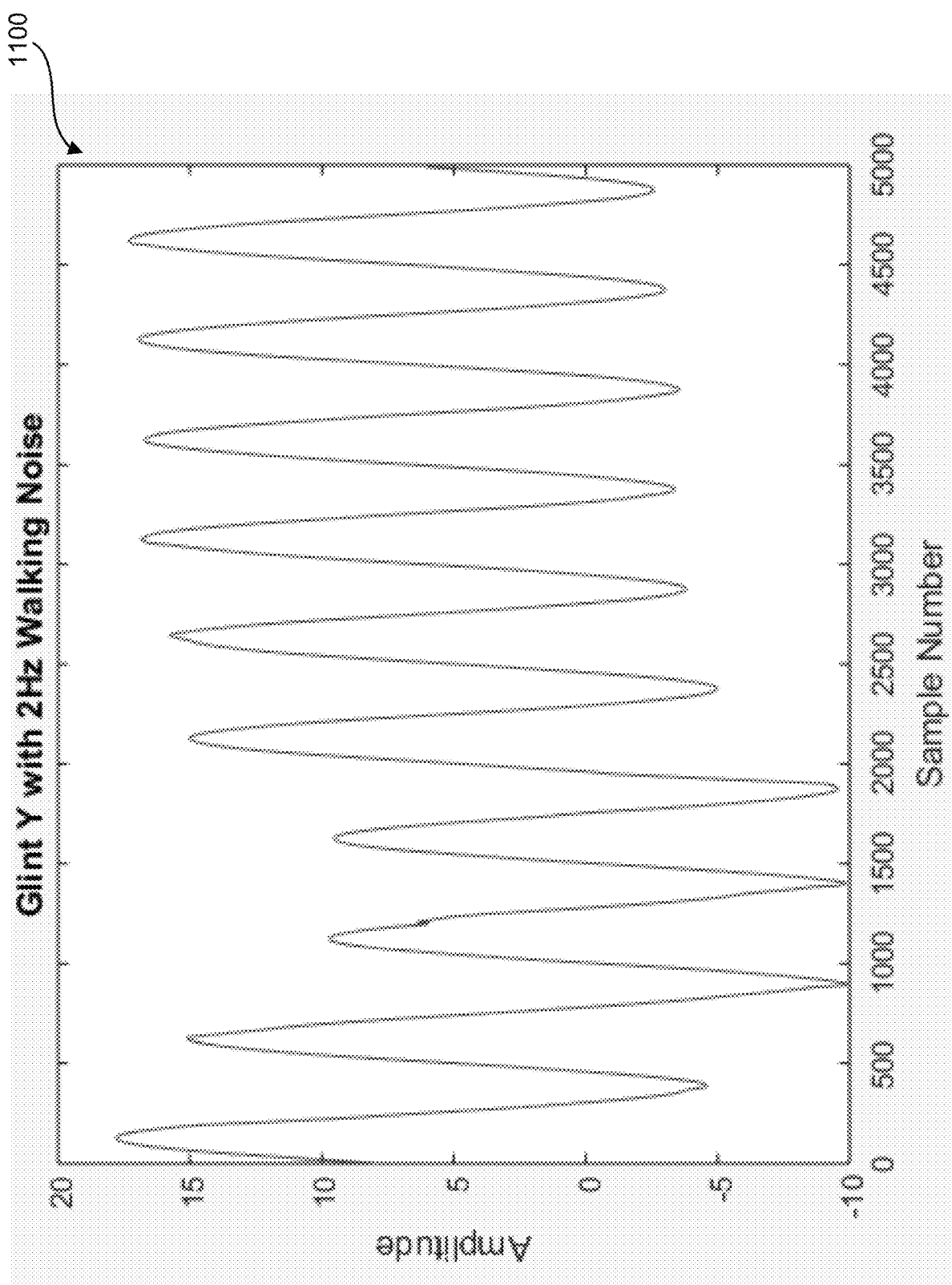
FIG. 11 shows an example graph, which plots the Y coordinates of the glint data of the graph of FIG. 10 as a time series, in accordance with a non-limiting implementation.

FIG. 11 shows an example graph 1100, which plots the Y coordinates of the glint data of graph 1000 as a time series. When comparing graph 1100 to graphs 600 and 900, the changes due to the simulated movements may be observed. As shown in graph 1100, when the amplitude of the movement of the heads-up display is relatively large, the effect of such movement of the heads-up display on the glint data may be to substantially distort or mask the pattern in the glint data caused by changes in the gaze of the eye being tracked.

Figure 12:
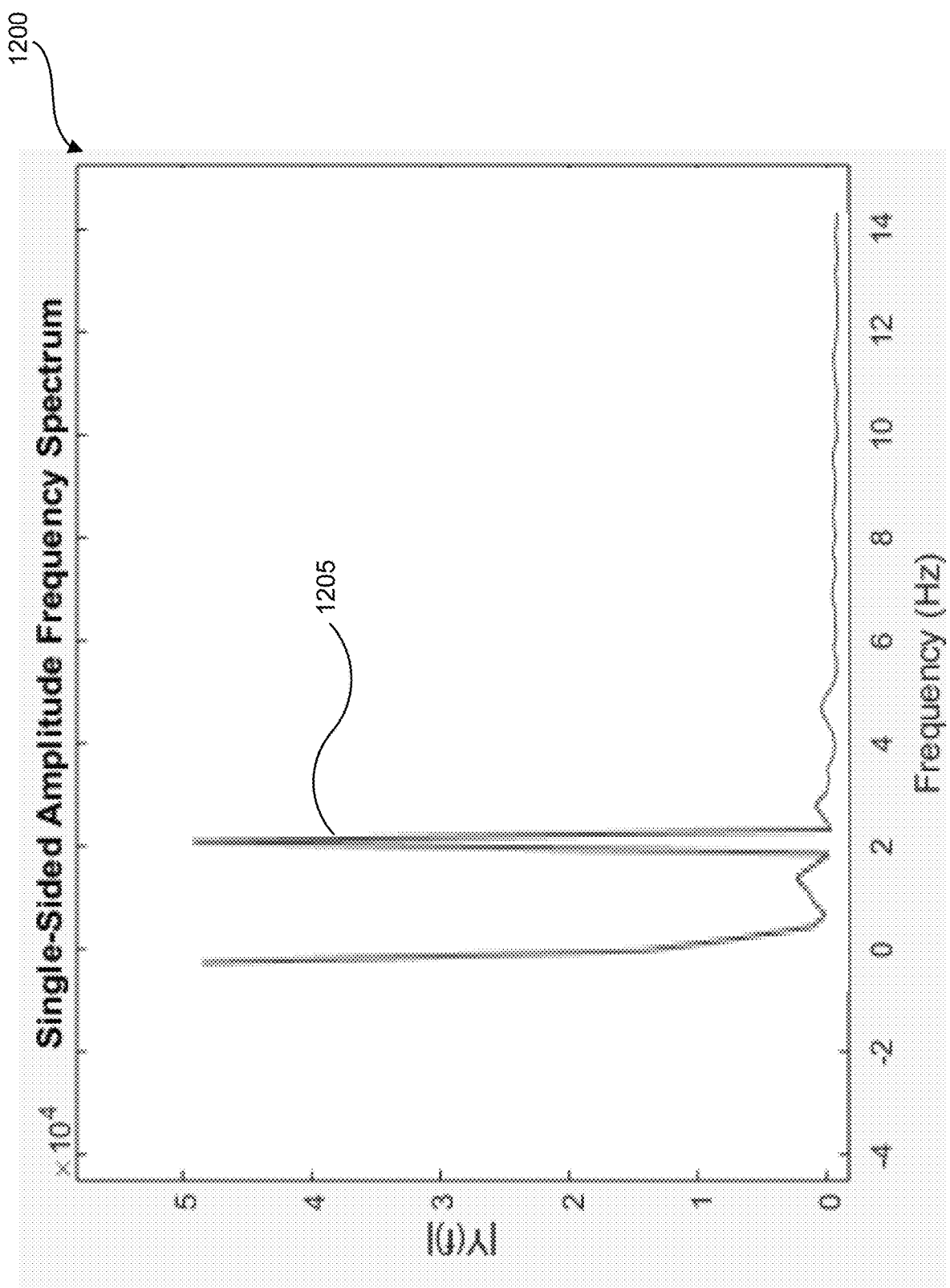
FIG. 12 shows an example graph of an example glint frequency spectrum of the glint data shown in FIG. 11, in accordance with a non-limiting implementation.

FIG. 12, in turn, shows an example graph 1200, which shows the glint frequency spectrum of the glint data shown in FIG. 11. Peak 1205 in the glint frequency spectrum shown in graph 1200 represents a feature or signature corresponding to the movement of the heads-up display in the time domain glint data shown in graphs 1000 and 1100. The presence of peak 1205 in the glint frequency spectrum may represent an indication that the glint is unstable due to the movement of the heads-up display relative to the head, face, or eye of the wearer caused by the wearer engaging in a physical activity such as skipping to horseback riding. Once peak 1205 is detected, the glint may be classified as unstable and the eye tracking may be switched from a first mode that tracks the glint center, to a second mode which may be less sensitive to glint stability. Examples of such a second mode include tracking the glint-pupil vector, and the like.

Figure 13:
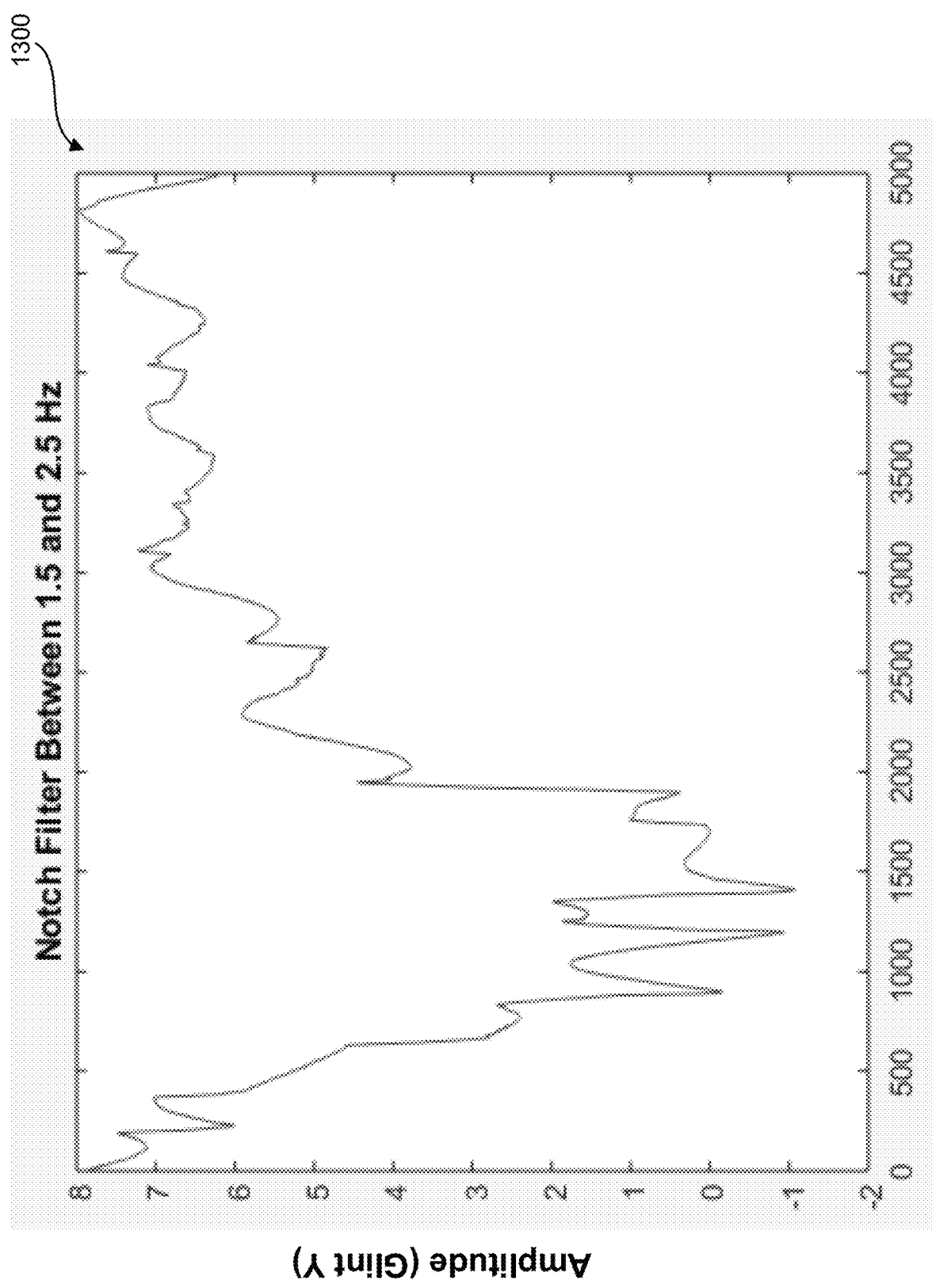
FIG. 13 shows an example graph which plots as an example time series the Y coordinates of the glint data obtained by filtering the glint frequency spectrum of the graph of FIG. 12 and converting the glint frequency spectrum into the time domain, in accordance with a non-limiting implementation.

In addition, in some examples peak 1205 may be filtered or attenuated to generate a conditioned glint frequency spectrum. This conditioned spectrum may then be converted back into the time domain, for example using an inverse Fourier transform or the like, attenuating or removing peak 1205 in the frequency domain may help to remediate or clean-up the glint data in the time domain. FIG. 13 shows a graph 1300 which plots the Y coordinates of the glint data of graph 1200 as a time series. When comparing the remediated glint data of graph 1300 with the graphs 1100 and 600, it may be observed that the remediated glint data of graph 1300 bears a stronger resemblance to the movement-free glint data of graph 600 than the resemblance of the unremediated glint data of graph 1100 to graph 600.

Figure 14:
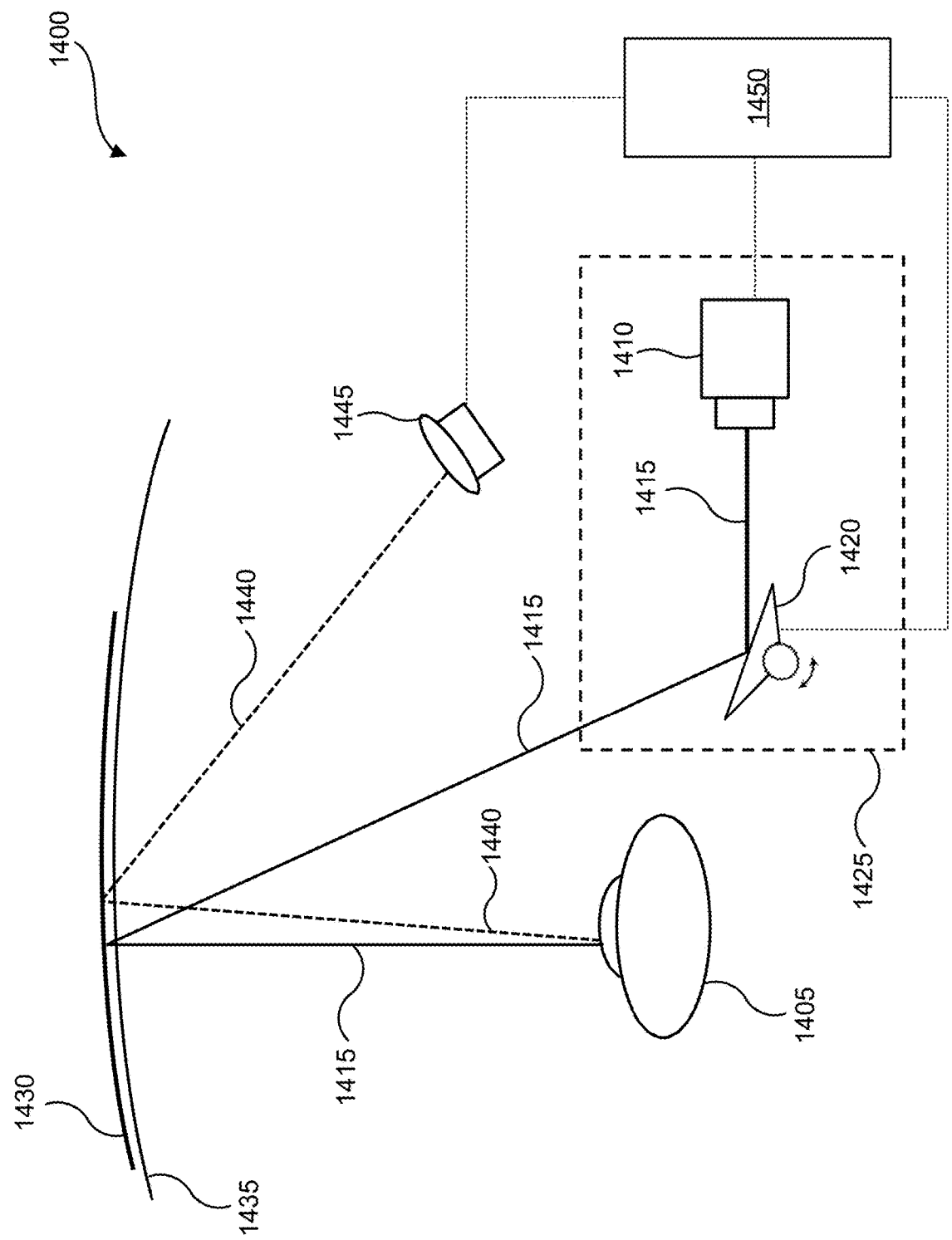
FIG. 14 shows a schematic representation of an example system to track a gaze of an eye, in accordance with a non-limiting implementation.

Turning now to FIG. 14, a schematic representation of an example system 1400 is shown. System 1400 may be used to track a gaze of an eye 1405. System 1400 may comprise a light source 1410 to generate a source light 1415. Light source 1410 may comprise a laser, a light emitting diode, and the like. In some examples, light source 1410 may generate infrared or near-infrared light. System 1400 may also comprise a spatial modulator 1420 to receive source light 1415 from light source 1410. In some examples, spatial modulator 1420 may comprise a movable reflector, a micro-electro-mechanical system (MEMS), a digital micromirror device (DMD), and the like.

The combination of light source 1410 and spatial modulator 1420 may be described as a light source module 1425. It is contemplated that in some examples light source module 1425 may comprise a light source and need not comprise a spatial modulator.

Furthermore, system 1400 may comprise an optical element 1430 to receive source light 1415 from spatial modulator 1420 and direct the source light towards eye 1405 of a viewer. In some examples, optical element 1430 may comprise an optical combiner such as a holographic optical combiner, and the like. Moreover, in some examples system 1400 may be a part of or incorporated into a wearable heads-up display. Such a heads-up display may have different designs or form factors, such as the form factor of eyeglasses, as will be described in greater detail in relation to FIG. 17. In examples where system 1400 is in the form factor of glasses, optical element 1430 may be on or in a lens 1435 of the glasses.

While FIG. 14 shows optical element 1430 as being proximate or secured to lens 1435, it is contemplated that in some examples the optical element need not be proximate to or a part of a lens. Moreover, it is also contemplated that in some examples system 1400 need not comprise a lens or need not be in the form factor of eye glasses.

Source light 1415 incident upon eye 1405 may be reflected from eye 1405 to form a reflected light 1440, which reflected light may propagate towards optical element 1430. Reflected light 1440 may comprise a glint of eye 1405. In other words, reflected light 1440 may contain information regarding the glint of eye 1405. Optical element 1430, in turn, may reflect reflected light 1440 towards a detector 1445. In some examples, detector 1445 may comprise a camera, a photo-detector, a photo-diode, and the like. Detector 1445 may detect reflected light 1440 including the glint of eye 1405. While FIG. 14 shows reflected light 1440 propagating from eye 1405 to detector 1445 via optical element 1430, it is contemplated that in some examples reflected light 1440 may take a different path from eye 1405 to detector 1445. For example, detector 1445 may be positioned to receive the reflected light directly from eye 1405.

In addition, system 1400 comprises a controller 1450 in communication with light source 1410, spatial modulator 1420, and detector 1445. Controller 1450 may control light source 1410, spatial modulator 1420 or detector 1445 to track a gaze of eye 1405 in a first tracking mode. To track the gaze, controller 1450 may receive from detector 1445 glint data of the glint of eye 1405. The glint data may be in a time domain. Moreover, the glint data may comprise a time series of a spatial descriptor associated with the glint. In some examples, the glint data may comprise a spatial coordinate of a glint center of the glint as a function of time.

Furthermore, controller 1450 may transform the glint data into a frequency domain to generate a glint frequency spectrum. In some examples, to transfer the glint data controller 1450 may Fourier transform the glint data. It is contemplated that in some examples controller 1450 may use other frequency analysis or transformation techniques instead of or in addition to the Fourier transformation.

Controller 1450 may also determine a stability of the glint based on the glint frequency spectrum. In some examples, to determine the stability controller 1450 may examine the glint frequency spectrum for the presence of a predetermined feature. If the predetermined feature is present in the glint frequency spectrum, controller 1450 may classify the glint as unstable. Examples of such features include peaks or sets of peaks, patterns, slopes or changes of slope, inflection points, values or normalized values, and the like found in the glint frequency spectrum. Moreover, in some examples the predetermined feature may comprise characteristics of a portion of or all of the glint frequency spectrum.

Furthermore, in some examples the predetermined feature may be obtained based on a plurality of glint data sets. For example, as discussed above, a training glint data set may be used to train a classification engine to detect features that may be associated with glint instability.

In some examples, a determination of glint instability may be indicative of system 1400 moving relative to the face, head, or eye of the viewer. Such movement may be caused, for example, by physical activity such as walking, running, skipping, horseback riding, skiing, and the like.

In addition, in some examples if the predetermined feature is present in the glint frequency spectrum, controller 1450 may compare the predetermined feature against a library of features to determine the type of physical motion or activity of the viewer associated with the predetermined feature. In some examples, a classification engine may be used to determine the type of physical activity based on the predetermined feature. Such a classification engine may be a part of or a functional module of controller 1450, or may be external to controller 1450. In this manner, detecting the predetermined features in the glint frequency spectrum may be used to detect or track various types of physical activity of the wearer or user of system 1400.

Furthermore, in some examples controller 1450 may switch from the first tracking mode to a second tracking mode if the glint is determined to be unstable. The second tracking mode may be less sensitive to glint instability. For example, the first tracking mode may comprise tracking a glint center of the glint and the second tracking mode may comprise tracking a glint-pupil vector associated with the glint. Moreover, in some examples, the second tracking mode need not comprise a glint-based tracking mode.

In some examples, once a feature indicative of glint instability is detected in the glint frequency spectrum, controller 1450 may condition the glint frequency spectrum to filter or attenuate the feature to form a conditioned glint frequency spectrum. Controller 1450 may then transform the conditioned glint frequency spectrum into the time domain.

In converting the glint data from the time domain into the frequency domain, the quality or fidelity of the glint frequency spectrum may be enhanced by increasing the number of data values in the glint data associated with the glint. In some examples, a beam splitter may be used to split the source light into multiple output beams directed onto the eye. Each output beam may then generate a corresponding reflected beam comprising a glint of the eye. This in turn may increase the number of glints detected and increase the number of glint data values available for forming the glint frequency spectrum.

Figure 15:
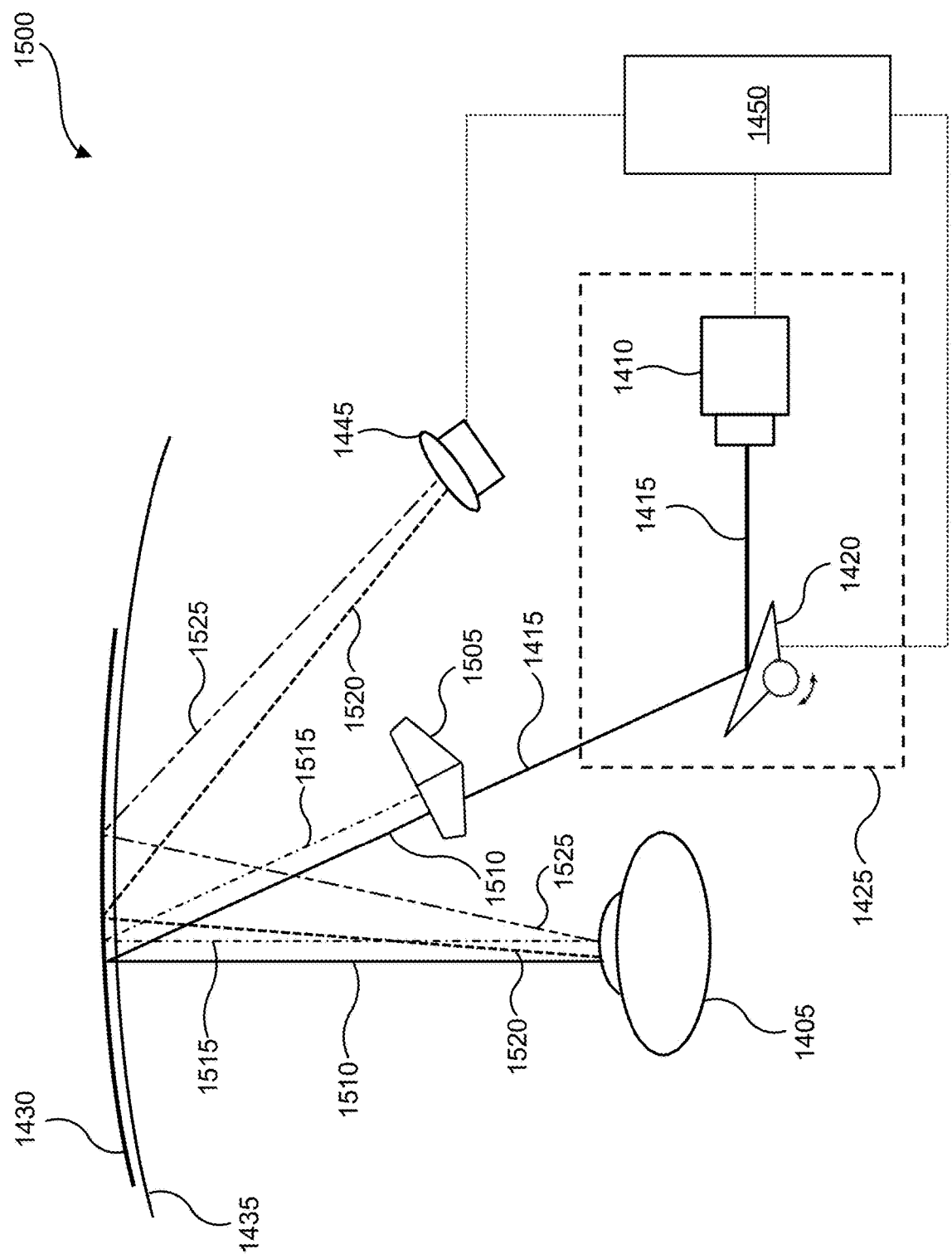
FIG. 15 shows a schematic representation of another example system to track a gaze of an eye, in accordance with a non-limiting implementation.

FIG. 15 shows a schematic representation of an example system 1500. System 1500 comprises components and performs functions that are similar to those of system 1400. One difference between systems 1400 and 1500 is that system 1500 comprises a beam splitter 1505 disposed in the optical path of the source light between spatial modulator 1420 and optical element 1430. Beam splitter 1505 receives source light 1415 from spatial modulator 1420 and splits source light 1415 into a first output beam 1510 and a second output beam 1515. The output beams may propagate towards optical element 1430. Beam splitter 1505 may split source light 1415 by intensity, polarization, wavelength or wavelength range, and the like.

Output beam 1510 is directed by optical element 1430 towards eye 1405. Output beam 1510 is then reflected from eye 1405 to generate a corresponding reflected beam 1520 comprising a glint of eye 1405. Reflected beam 1520 propagates towards optical element 1430, which directs reflected beam 1520 towards detector 1445. Similarly, output beam 1515 is directed by optical element 1430 towards eye 1405. Output beam 1515 is then reflected from eye 1405 to generate a corresponding reflected beam 1525 comprising a corresponding glint of eye 1405. Reflected beam 1525 propagates towards optical element 1430, which directs reflected beam 1525 towards detector 1445.

In some examples, reflected beams 1520 and 1525 may be directed towards different or non-overlapping areas of eye 1405. In this manner, glint data obtained from reflected beams 1520 and 1525 may provide temporally distinct or separate glint data values. Moreover, while FIG. 15 shows beam splitter 1505 splitting source light 1415 into two output beams 1510 and 1515, it is contemplated that in some examples the beam splitter may split the source light into three or more output beams. Furthermore, it is contemplated that in some examples multiple beam splitters may be used in series or in a cascading manner to split the source light into a plurality of output beams.

Figure 16:
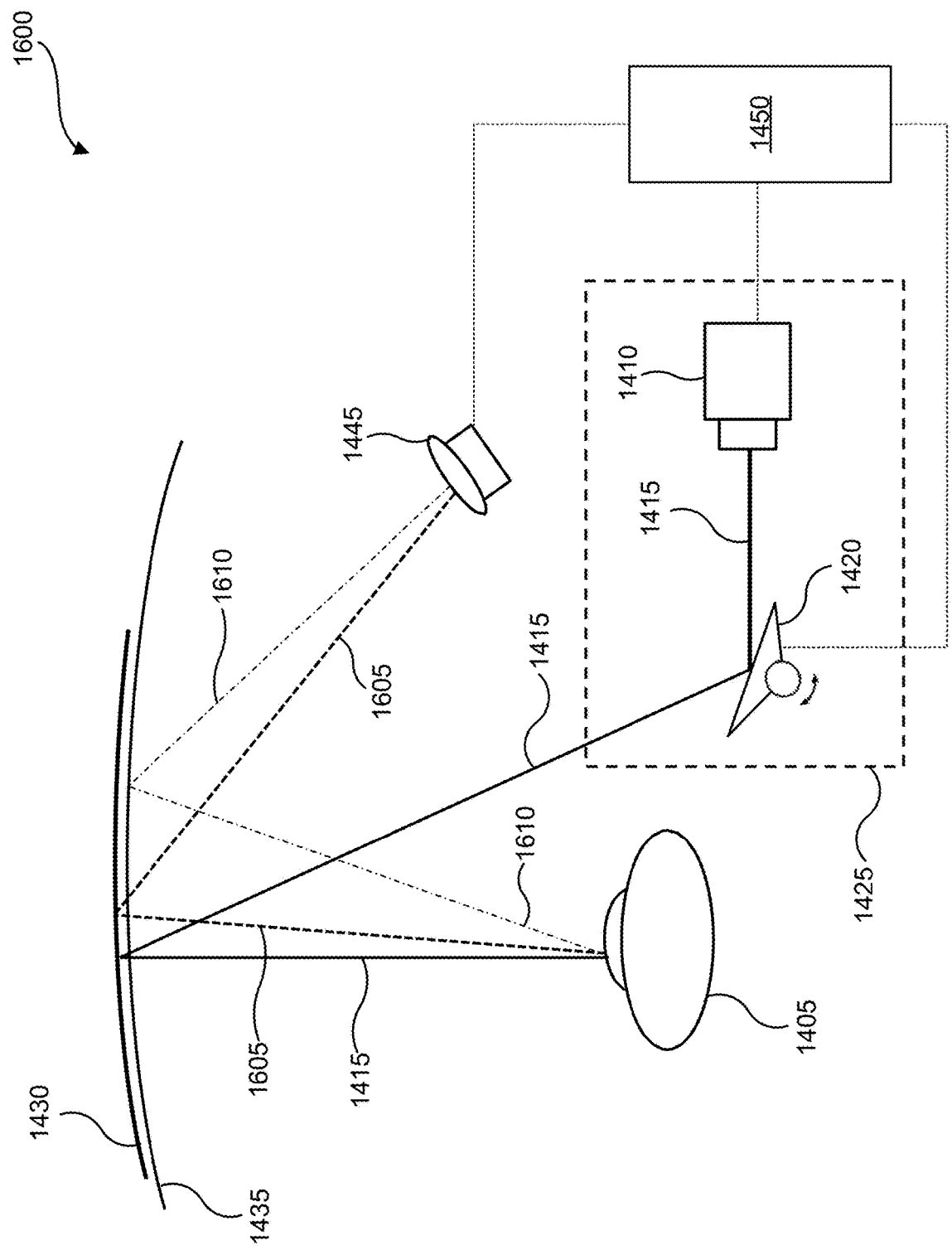
FIG. 16 shows a schematic representation of yet another example system to track a gaze of an eye, in accordance with a non-limiting implementation.

In addition, in some examples temporally distinct glint data values may be obtained by obtaining glint data from a plurality of reflected beams each taking an optical path of a different length from the eye to the detector. FIG. 16 shows a schematic representation of an example system 1600. System 1600 comprises components and performs functions that are similar to those of system 1400. One difference between systems 1400 and 1600 is that in system 1600 multiple reflected light beams are detected by detector 1445.

In system 1600, source light 1415 is directed onto eye 1405, which reflects source light 1415 to generate a first reflected beam 1605 and a second reflected beam 1610. Reflected beams 1605 and 1610 may propagate towards optical element 1430 and lens 1435, and then be directed towards detector 1445. Reflected beam 1605 may be reflected by optical element 1430 towards detector 1445. Each of reflected beams 1605 and 1610 may comprise corresponding glint data, which may be referred to as primary and secondary glints respectively.

Reflected beam 1605 and its optical path to detector 1445 may be similar to reflected light 1440 shown in FIG. 14. Reflected beam 1610, in turn, may propagate in a direction different than the direction of reflected beam 1605. In addition, reflected beam 1610 may be reflected by lens 1435 towards detector 1445. These differences may cause the optical path of reflected beam 1605 from eye 1405 to detector 1445 to have a different length than the corresponding optical path of reflected beam 1610 from eye 1405 to detector 1445. Due to their different optical path lengths between eye 1405 and detector 1445, the glint data associated with reflected light beams 1605 and 1610 may represent temporally distinct glint data values.

While FIG. 16 shows only two reflected beams 1605 and 1610, it is contemplated that in some examples three or more reflected beams may be received by detector 1445. In addition, it is contemplated that in some examples the reflected beams need not be reflected by the optical element or the lens, and may be reflected from a different component of the system or may propagate directly from the eye to the detector.

In some examples, the controllers described herein such as controller 1450 may comprise a processor in communication with a non-transitory processor-readable medium. The processor-readable medium may comprise instructions to cause the processors to control the light source, the spatial modulator, and the controller as described in relation to the methods and systems described herein. Moreover, in some examples the controllers may be free-standing components, while in other examples the controllers may comprise functional modules incorporated into other components of their respective systems.

Furthermore, in some examples the controllers or their functionality may be implemented in other ways, including: via Application Specific Integrated Circuits (ASICs), in standard integrated circuits, as one or more computer programs executed by one or more computers (e.g., as one or more programs running on one or more computer systems), as one or more programs executed by on one or more controllers (e.g., microcontrollers), as one or more programs executed by one or more processors (e.g., microprocessors, central processing units, graphical processing units), as firmware, and the like, or as a combination thereof.

Figure 17:
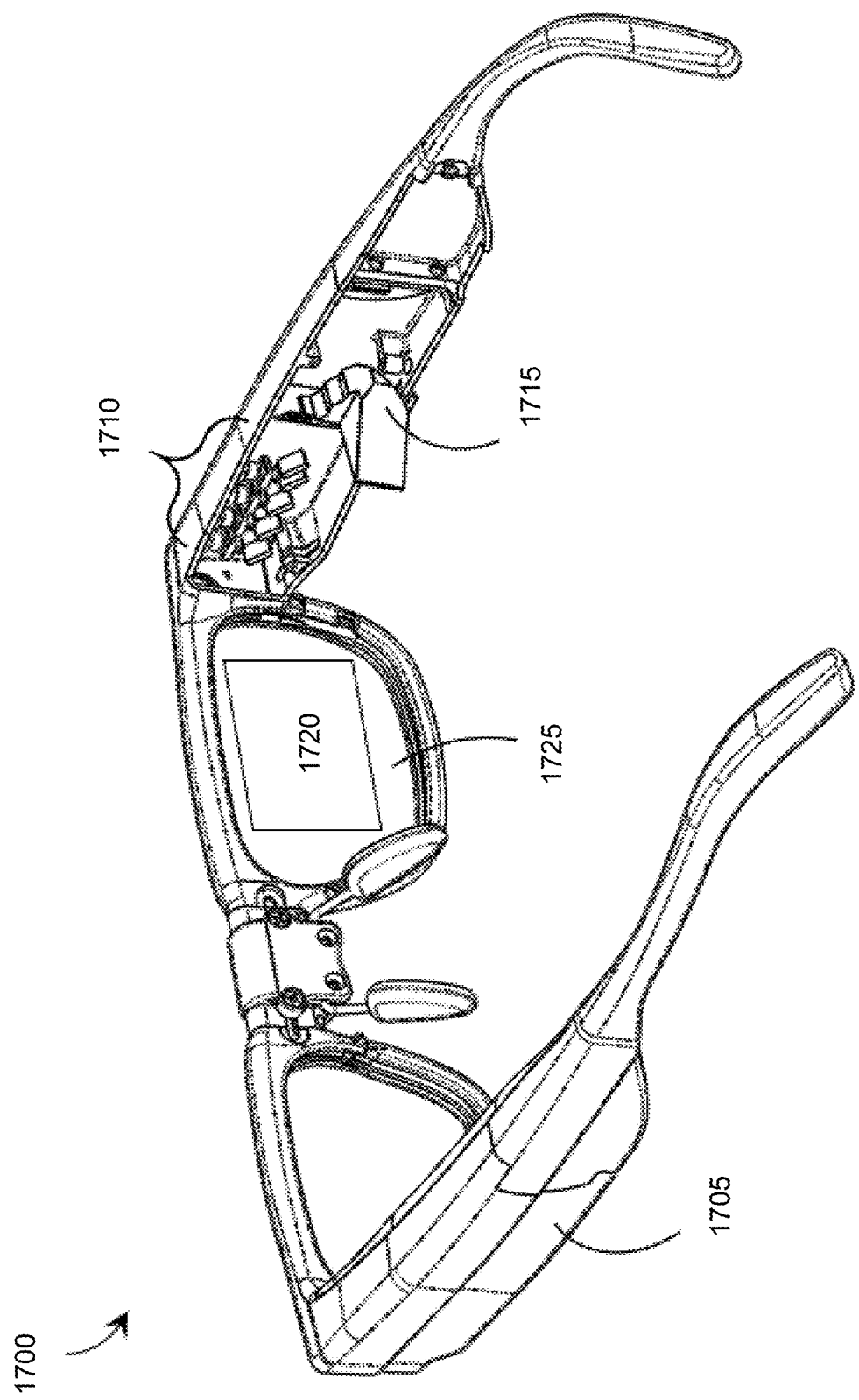
FIG. 17 shows a partial-cutaway perspective view of an example wearable heads-up display, in accordance with a non-limiting implementation.

Turning now to FIG. 17, a partial-cutaway perspective view of an example wearable heads-up display (WHUD) 1700 is shown. WHUD 1700 includes a support structure 1705 that in use is worn on the head of a user and has the general form factor and appearance of an eyeglasses (e.g., sunglasses) frame. Eyeglasses or sunglasses may also be generically referred to as "glasses". Support structure 1705 may carry components of a system to track the gaze of an eye of the wearer, such as systems 1400, 1500, 1600. For example, the light source module or the detector of the eye tracking system may be received in a space 1710 in a side arm of support structure 1705. In other examples, one or more of the eye tracking system components or systems described herein may be received in or carried by support structure 1705.

The spatial modulator of the systems described herein may be received in or be part of component 1715 of support structure 1705. The spatial modulator in turn may direct the source light onto a display element 1720 carried by a lens 1725 of support structure 1705. In some examples, display element 1720 and lens 1725 may be similar in structure and function to display element 1430 and lens 1435 respectively.

The term "carries" and variants such as "carried by" are generally used to refer to a physical coupling between two objects. The physical coupling may be direct physical coupling (i.e., with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, or supported by, with or without any number of intermediary physical objects therebetween.

It is contemplated that the systems described herein may have the features or perform the functions described in relation to method 200 and the other methods described herein. Furthermore, it is contemplated that in some examples the systems described herein may carry out methods or perform functions other than those of the methods described herein.

In addition, it is contemplated that the methods described herein may include the features or perform the functions described in relation to the systems described herein. Moreover, while method 200 and the other methods described herein may be performed by some or all of the systems described herein, it is contemplated that in some examples method 200 and the other methods described herein may also be performed using systems or devices other than the systems described herein.

Throughout this specification and the appended claims, infinitive verb forms are often used. Examples include, without limitation: "to generate," "to emit," "to receive," "to detect," and the like. Unless the specific context requires otherwise, such infinitive verb forms are used in an open, inclusive sense, that is as "to, at least, generate," "to, at least, receive," "to, at least, detect," and so on.

The above description of illustrated embodiments, including what is described in the Abstract of the disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

The invention claimed is:

1. A system for tracking a gaze of an eye, comprising:
a light source to generate a source light;
a spatial modulator to receive the source light from the light source;
an optical element to receive the source light from the spatial modulator and direct the source light towards an eye of a viewer;
a detector to detect a reflected light reflected from the eye, the reflected light associated with the source light, the reflected light comprising at least one glint of the eye; and
a controller in communication with the light source, the spatial modulator, and the detector, the controller to:
track a gaze of the eye in a first tracking mode;
receive glint data from the detector, the glint data in a time domain, the glint data comprising a time series of a spatial descriptor associated with the at least one glint of the eye;
transform the glint data into a frequency domain to generate a glint frequency spectrum;
determine a stability of the glint based on the glint frequency spectrum; and
switch tracking of the gaze of the eye from the first tracking mode to a second tracking mode that is different from the first tracking mode if the at least one glint is determined to be unstable.

2. The system of claim 1, wherein the glint data comprises a spatial coordinate of a glint center of the glint as a function of time.

3. The system of claim 1, wherein the controller is to transform the glint data by applying Fourier transform to the glint data.

4. The system of claim 1, wherein the controller is to:
examine the glint frequency spectrum for the presence of a predetermined feature; and
if the predetermined feature is present in the glint frequency spectrum, classify the glint as unstable.

5. The system of claim 4, wherein the controller is to obtain the predetermined feature based on a plurality of sets of glint data.

6. The system of claim 4, wherein the controller is further to:
condition the glint frequency spectrum to filter the predetermined feature to form a conditioned glint frequency spectrum; and
transform the conditioned glint frequency spectrum into the time domain.

7. The system of claim 4, wherein the controller is further to:
if the predetermined feature is present in the glint frequency spectrum, compare the predetermined feature against a library of features to determine a type of physical motion of the viewer associated with the predetermined feature.

8. The system of claim 1, further comprising:
a beam splitter disposed in an optical path between the spatial modulator and the optical element, the beam splitter to receive the source light from the spatial modulator and to split the source light into a plurality of output beams propagating towards the optical element; and
wherein:
the optical element is to direct the output beams towards the eye;
the reflected light comprises a plurality of reflected beams each associated with a corresponding one of the output beams, the reflected beams each comprising an associated glint of the eye; and
to receive the glint data the controller is to receive corresponding glint data associated with each of the plurality of the reflected beams.

9. The system of claim 1, wherein the reflected light comprises:
a first reflected beam associated with the source light, the first reflected beam traveling along a first path from the eye to the detector; and
a second reflected beam associated with the source light, the second reflected beam traveling along a second path from the eye to the detector, a length of the second path being different than a corresponding length of the first path; and
to receive the glint data the controller is to receive corresponding glint data associated with each of the first reflected beam and the second reflected beam.

10. The system of claim 1, wherein the controller is to track the gaze of the eye in the first tracking mode by tracking a glint center of the at least one glint, and wherein the controller is to track the gaze of the eye in the second mode by tracking a glint-pupil vector associated with the at least one glint.

11. A method of tracking a gaze of an eye, comprising:
tracking the gaze of an eye in a first tracking mode;
obtaining glint data of at least one glint of the eye during at least a portion of tracking the gaze of the eye in the first tracking mode, the glint data in a time domain, the glint data comprising a time series of a spatial descriptor associated with the at least one glint;
transforming the glint data into a frequency domain to generate a glint frequency spectrum;
determining a stability of the at least one glint based on the glint frequency spectrum; and
switching from tracking the gaze of the eye in the first tracking mode to tracking the gaze of the eye in a second tracking mode that is different from the first tracking mode if the at least one glint is determined to be unstable.

12. The method of claim 11, wherein the glint data comprises a spatial coordinate of a glint center of the glint as a function of time.

13. The method of claim 11, wherein the transforming the glint data comprises Fourier transforming the glint data.

14. The method of claim 11, wherein the determining the stability comprises:
examining the glint frequency spectrum for the presence of a predetermined feature; and
if the predetermined feature is present in the glint frequency spectrum, classifying the glint as unstable.

15. The method of claim 14, wherein the predetermined feature is obtained based on a plurality of sets of glint data.

16. The method of claim 14, further comprising:
conditioning the glint frequency spectrum to filter the predetermined feature to form a conditioned glint frequency spectrum; and
transforming the conditioned glint frequency spectrum into the time domain.

17. The method of claim 14, further comprising:
if the predetermined feature is present in the glint frequency spectrum, comparing the predetermined feature against a library of features to determine a type of physical motion associated with the predetermined feature.

18. The method of claim 11, wherein the obtaining the glint data comprises:
- directing a source light onto a beam splitter to split the source light into a plurality of output beams;
- directing the output beams onto the eye;
- detecting a plurality of reflected beams reflected from the eye, each of the reflected beams associated with a corresponding output beam; and
- obtaining corresponding glint data associated with each of the reflected beams.

19. The method of claim 11, wherein the obtaining the glint data comprises:
- directing a light beam onto the eye to generate a first reflected beam and a second reflected beam reflected from the eye;
- detecting the first reflected beam traveling along a first path from the eye to a detector;
- detecting the second reflected beam traveling along a second path from the eye to the detector, a length of the second path being different than a corresponding length of the first path; and
- obtaining corresponding glint data associated with each of the first reflected beam and the second reflected beam.

20. The method of claim 11, wherein tracking the gaze of the eye in the first tracking mode is based on tracking a glint center of the glint and tracking in the second tracking mode is based on tracking a glint-pupil vector associated with the glint.

* * * * *